(12) United States Patent
Kudo et al.

(10) Patent No.: US 8,064,161 B2
(45) Date of Patent: Nov. 22, 2011

(54) PERPENDICULAR MAGNETIC RECORDING HEAD AND METHOD FOR MANUFACTURING THE SAME

(75) Inventors: Kazue Kudo, Kanagawa (JP); Hiromi Shiina, Ibaraki (JP); Gen Oikawa, Kanagawa (JP); Yohji Maruyama, Saitama (JP); Noriyuki Saiki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 537 days.

(21) Appl. No.: 12/231,246

(22) Filed: Aug. 28, 2008

(65) Prior Publication Data

US 2009/0059427 A1 Mar. 5, 2009

(30) Foreign Application Priority Data

Aug. 30, 2007 (JP) ................. 2007-224543

(51) Int. Cl.
*H04R 31/00* (2006.01)
*G11B 5/147* (2006.01)

(52) U.S. Cl. ........... 360/125.02; 360/125.12; 29/603.14; 29/603.23

(58) Field of Classification Search ............. 360/125.12, 360/125.02, 125.08, 125.26, 125.3; 29/603.13, 29/603.14, 603.23, 603.24
See application file for complete search history.

(56) References Cited

U.S. PATENT DOCUMENTS

| | | | |
|---|---|---|---|
| 4,873,599 A * | 10/1989 | Sueoka | 360/125.12 |
| 6,233,116 B1 * | 5/2001 | Chen et al. | 360/125.5 |
| 6,259,583 B1 * | 7/2001 | Fontana et al. | 360/125.5 |
| 6,275,360 B1 | 8/2001 | Nakamoto et al. | |
| 7,218,475 B2 | 5/2007 | Matono et al. | |
| 7,221,538 B2 * | 5/2007 | Kawato et al. | 360/125.04 |
| 7,554,765 B2 * | 6/2009 | Shukh et al. | 360/125.12 |
| 7,609,478 B2 * | 10/2009 | Han et al. | 360/125.12 |

(Continued)

FOREIGN PATENT DOCUMENTS

JP 2004-310968 A 11/2004

*Primary Examiner* — Julie Anne Watko

(74) *Attorney, Agent, or Firm* — Zilka-Kotab, PC (57) ABSTRACT

Embodiments of the present invention help to provide a perpendicular magnetic recording head capable of writing a signal in a track having a small width. According to one embodiment, a perpendicular magnetic recording head includes an auxiliary pole, a main pole, a yoke, a coil, a first soft magnetic film and a second soft magnetic film. The yoke is in contact with the main pole. The coil is wound around a magnetic circuit composed of the auxiliary and main poles and the yoke. The first soft magnetic film is provided on both sides of the main pole with a non-magnetic film provided between the first soft magnetic film and the main pole. The second soft magnetic film is provided on the trailing side of the main pole with the non-magnetic film provided between the second soft magnetic film and the main pole. The first and second soft magnetic films are two types of plated magnetic films. One type of the plated magnetic films have respective thicknesses of 0.5 nm to 20 nm and respective body centered cubic lattice crystal structures. The other types of the plated magnetic films have respective thicknesses of 0.5 nm to 20 nm and respective face centered cubic lattice crystal structures. The two types of the plated magnetic films are alternately laminated with four or more layers. This can achieve the magnetic disk drive capable of reducing a possibility to erroneously delete a signal after the signal being written and preventing degradation of characteristics of a high frequency signal.

18 Claims, 8 Drawing Sheets

U.S. PATENT DOCUMENTS

| | | |
|---|---|---|
| 7,933,096 B2 * | 4/2011 | Allen et al. .............. 360/125.26 |
| 7,995,311 B2 * | 8/2011 | Kudo et al. ................... 360/319 |
| 8,004,794 B2 * | 8/2011 | Zhou et al. ............... 360/125.31 |
| 2003/0048582 A1 * | 3/2003 | Kanada et al. ................ 360/126 |
| 2004/0004786 A1 * | 1/2004 | Shukh et al. .................. 360/126 |
| 2004/0120074 A1 * | 6/2004 | Okada et al. .................. 360/126 |
| 2004/0150912 A1 * | 8/2004 | Kawato et al. ................ 360/126 |
| 2007/0019327 A1 | 1/2007 | Maruyama et al. |

* cited by examiner

| | |
|---|---|
| Ni$^{2+}$ (g/l) | 5 ~ 25 |
| Fe$^{2+}$ (g/l) | 5 ~ 15 |
| Sodium Saccharin (g/l) | 1.5 ± 1.0 |
| Anode | Nickel (4N) |
| NaCl (g/l) | 25 ± 5 |
| H$_3$BO$_3$ (g/l) | 25 ± 5 |
| Temperature (C) | 30 ± 1 |
| pH | < 2.0 |

PERPENDICULAR MAGNETIC RECORDING HEAD AND METHOD FOR MANUFACTURING THE SAME

CROSS-REFERENCE TO RELATED APPLICATION

The instant nonprovisional patent application claims priority to Japanese Patent Application No. 2007-224543 filed Aug. 30, 2007 and which is incorporated by reference in its entirety herein for all purposes.

BACKGROUND OF THE INVENTION

In recent years, there has been a demand to increase the storage capacity and to reduce the size of magnetic disk drives used as an external recording devices for information processing devices such as computers. To meet the demand, the recording density of the magnetic disk drive has been increased. Accompanying with the increase in the recording density, there is an urgent demand to develop a perpendicular magnetic recording technique to increase the recording density in place of conventional longitudinal magnetic recording techniques.

In the case where a signal is written in a perpendicular magnetic recording medium using a perpendicular magnetic recording head, an electrical signal is converted into a magnetic signal by means of a coil and a magnetic flux is excited in main and auxiliary poles. The magnetic flux propagates from the auxiliary pole to the main pole. The magnetic flux then passes through a perpendicular recording layer and a soft magnetic layer formed under the perpendicular recording layer. The magnetic flux then returns to the auxiliary pole. This forms a closed circuit. In this case, the auxiliary pole is used to return, to the main pole in a magnetically efficient manner, the magnetic flux which passes through the main pole, the perpendicular recording layer and the soft magnetic layer. The signal is written as magnetization in the perpendicular recording medium using such a flow of the magnetic flux.

In perpendicular recording, it is necessary that the width of each magnetization transition region be reduced more to ensure that signals are efficiently written in regions, which are adjacent to each other and have respective magnetization directions opposite to each other. Japanese Patent Publication No. 2004-310968 ("Patent Document 1") discloses a perpendicular magnetic recording head having a soft magnetic film mounted on the side of a main pole in a direction of a track width of a recording medium. Japanese Patent Publication No. 2005-18851 ("Patent Document 2") discloses a perpendicular magnetic recording head capable of applying a magnetic field having a steep gradient to a recording medium due to a soft magnetic film provided on the trailing side of a main pole. Japanese Patent Publication No. 2007-35082 ("Patent Document 3") discloses a structure in which magnetic shield films surrounding a main pole are provided. One of the magnetic shield films is provided on the main pole side to prevent a magnetic field from leaking to an adjacent track of a recording medium, and the other one is provided on the upper side (trailing side) of the main pole to cause the magnetic field to have a steep gradient.

Each of the magnetic shield films described in Patent Document 3 includes a Fe—Ni based material such as permalloy to absorb a magnetic field leaking from the main pole. A yoke is provided in contact with an edge portion of the main pole, which is located on the opposite side of the recording medium. The yoke also includes a Fe—Ni based material, such as permalloy, to cause a magnetic field to be introduced into the main pole.

Japanese Patent Publication No. 1999-161920 ("Patent Document 4") does not disclose a perpendicular magnetic recording head, but discloses that a lower magnetic core, which also serves as an upper shield, is composed of a multilayer film including NiFeCo films and permalloy film formed between the NiFeCo films in order to stabilize the magnetic domain structure of the lower magnetic core.

Based on the abovementioned conventional techniques, a soft magnetic film is provided around a main pole to absorb a magnetic field leaking from the main pole side to an adjacent track and to allow the magnetic field on the upper side (trailing side) of the main pole to have a steep gradient. This structure allows a signal to be written in a track having a small width.

However, when the soft magnetic films described in the conventional techniques have large crystal grains, the magnetic domain tends to have magnetization aligned in the direction of the thickness thereof. The effect to absorb a magnetic field leaking from the main pole is therefore reduced. Especially, when the soft magnetic film surrounds the main pole, the effect is significantly reduced. This makes it impossible to write a signal in a track having a small.

In order to generate a recording magnetic field having a high intensity in the main pole, it is effective that a material used for the yoke has a high saturation flux density. In addition, it is desirable that the film has high magnetic permeability to allow a high frequency signal to be written. The permalloy film has high magnetic permeability of 3000 and a low saturation flux density of 1.0 T. A film containing Ni with a weight percent of 45 and Fe with a weight percent of 55 has a high saturation flux density of 1.6 T to 1.7 T and low magnetic permeability of 1500. The film containing Ni with a weight percent of 45 and Fe with a weight percent of 55 has magnetic permeability higher than that of the permalloy film and the saturation flux density lower than that of permalloy film. To write a signal in a track having a small width, it is necessary that the material have a high saturation flux density and high magnetic permeability.

As a data transmission rate and a recording density of a magnetic disk drive are increased, a frequency of a signal to be written is increased. A perpendicular recording technique may be adopted to write such a high frequency signal. However, such a technique may have a problem in that a signal is erroneously deleted after being written.

BRIEF SUMMARY OF THE INVENTION

Embodiments of the present invention provide a perpendicular magnetic recording head capable of writing a signal in a track having a small width. According to the particular embodiment of FIG. 1(a), a perpendicular magnetic recording head 10 includes an auxiliary pole, a main pole, a yoke, a coil, a first soft magnetic film and a second soft magnetic film. The yoke is in contact with the main pole. The coil is wound around a magnetic circuit composed of the auxiliary and main poles and the yoke. The first soft magnetic film is provided on both sides of the main pole with a non-magnetic film provided between the first soft magnetic film and the main pole. The second soft magnetic film is provided on the trailing side of the main pole with the non-magnetic film provided between the second soft magnetic film and the main pole. The first and second soft magnetic films are two types of plated magnetic films. One type of the plated magnetic films have respective thicknesses of 0.5 nm to 20 nm and respective body centered cubic lattice crystal structures. The other types of the plated magnetic films have respective thicknesses of 0.5 nm to 20 nm and respective face centered cubic lattice crystal structures. The two types of the plated magnetic films are alternately laminated with four or more layers. This can achieve the magnetic disk drive capable of reducing a possibility to erroneously delete a signal after the signal being written and preventing degradation of characteristics of a high frequency signal.

DETAILED DESCRIPTION OF THE INVENTION

Embodiments of the present invention relate to a perpendicular magnetic recording head to be mounted in a magnetic disk drive and a method for manufacturing the perpendicular magnetic recording head.

An object of certain embodiments of the present invention is to provide a perpendicular magnetic recording head capable of writing a signal in a track having a small width.

Another object of certain embodiments of the present invention is to provide a method for manufacturing the perpendicular magnetic recording head capable of writing a signal in a track having a small width.

To accomplish one or more of the above objects, the sizes of crystal grains contained in the soft magnetic films are reduced while soft magnetic characteristics of soft magnetic films used as magnetic shields are maintained. This leads to the fact that magnetization of a magnetic domain tends to be directed in a in-plane direction, and an effect to absorb a leaking magnetic field is increased.

A perpendicular magnetic recording head according to a first embodiment of the present invention includes: an auxiliary pole; a main pole; a yoke provided in contact with the main pole; a coil wound around a magnetic circuit composed of the auxiliary and main poles and the yoke; a first soft magnetic film provided on both sides of the main pole with a non-magnetic film present between the first soft magnetic film and the main pole; and a second soft magnetic film provided on the trailing side of the main pole with the non-magnetic film present between the second soft magnetic film and the main pole. The first and second soft magnetic films are two types of plated magnetic films. One type of the plated magnetic films have respective thicknesses of 0.5 to 20 nm and respective body centered cubic lattice crystal structures. The other type of the plated magnetic films have respective thicknesses of 0.5 to 20 nm and respective face centered cubic lattice crystal structures. The two types of plated magnetic films are alternately laminated with four or more layers.

In the perpendicular magnetic recording head according to the first embodiment of the present invention, it may be preferable that the first and second soft magnetic films be formed simultaneously to surround the main pole. The first and second soft magnetic films have magnetic permeability of 2500 or more. Each of the first and second soft magnetic films contains Ni and Fe. The weight percent of Ni contained in the entire first and second soft magnetic films is in a range of 15 to 60. The weight percent of Fe contained in the entire first and second soft magnetic films is in a range of 40 to 85. The two types of plated magnetic films having respective Ni with a weight percent ranging from 10 to 30 and the plated magnetic films having respective Ni with a weight percent ranging from 55 to 90 are alternately laminated.

A perpendicular magnetic recording head according to a second embodiment of the present invention includes: an auxiliary pole; a main pole; a yoke provided in contact with the main pole; and a coil wound around a magnetic circuit composed of the auxiliary and main poles and the yoke. The yoke provided in contact with the main pole includes two types of plated magnetic films. One type of the plated magnetic films have respective thicknesses of 0.5 nm to 20 nm and respective body centered cubic lattice crystal structures. The other type of the plated magnetic films have respective thicknesses of 0.5 nm to 20 nm and respective face centered cubic lattice crystal structures. The two types of plated magnetic films are alternately laminated with four or more layers. The plated magnetic films have magnetic permeability of 2500 or more. The yoke contains Ni and Fe. The weight percent of Ni contained in the entire plated magnetic films is in a range of 15 to 60. The weight percent of Fe contained in the entire plated magnetic films is in a range of 40 to 85. The two types of plated magnetic films having respective Ni with a weight percent ranging from 10 to 30 and the plated magnetic films having respective Ni with a weight percent ranging from 55 to 90 are alternately laminated. The entire plated magnetic films have a saturation flux density of 1.5 T or more.

In a perpendicular magnetic recording head according to a third embodiment of the present invention, the four or more plated magnetic films are used for the first and second soft magnetic films and used for the yoke.

According to a fourth embodiment of the present invention, a method for manufacturing any of the perpendicular magnetic recording heads according to the first to third aspects of the present invention is provided, in which the plated magnetic films used for the first and second soft magnetic films and used for the yoke are formed using a single plating bath with pH of 2.0 or less.

According to embodiments of the present invention, each of the soft magnetic films provided around the main pole has small crystal grains. This leads to the fact that magnetization of a magnetic domain tends to be directed in an in-plane direction, and an effect to absorb a leaking magnetic field is increased. A signal can therefore be written in a track having a small width. In addition, the yoke has a high saturation flux density and high magnetic permeability. This results in the fact that high frequency characteristics are excellent and overwrite characteristics are maintained. Therefore, high density recording can be achieved.

A description will be made of an example of the configuration of a perpendicular magnetic recording head according to an embodiment of the present invention with reference to FIGS. 1(a) and 1(b). FIG. 1(a) is a cross sectional view of the perpendicular magnetic recording head and shows the configuration of layers thereof. FIG. 1(b) is a schematic diagram showing the perpendicular magnetic recording head when viewed from the side of a floating surface thereof. The perpendicular magnetic recording head 10 has a lower magnetic shield film 16 and an upper magnetic shield film 14. The lower magnetic shield film 16 is provided on a non-magnetic substrate (not shown). The upper magnetic shield film 14 is provided above the lower magnetic shield film 16. A magnetic gap film 13 is provided between the lower and upper shield films 16 and 14. A read element 15 is also provided between the lower and upper shield films 16 and 14. The read element 15 may be a magnetoresistive (MR) sensor, a giant magnetoresistive (GMR) sensor, or a tunneling magnetoresistive (TMR) sensor. A magnetic domain control film (not shown) and an electrode film (not shown) are provided on both sides of the read element 15. The upper and lower magnetic shield films 14 and 16 and the read element 15 form a read head.

A write head is stacked above the upper magnetic shield film 14 provided under an insulating separation film 25. The write head has an auxiliary pole 19, a rear magnetic film 23, a base pole 24 and a coil 20. The rear magnetic film 23, the base pole 24 and the coil are provided above the insulating separation film 25 made of alumina or the like. The write head also includes a yoke 17, a main pole 18, a first soft magnetic film (side shield) 21, a second soft magnetic film (trailing shield) 22, a coil 20 and a magnetic film 26. The yoke 17 is magnetically connected with the rear magnetic film 23. The main pole 18 is provided in contact with an edge portion of the yoke 17, which is located on the side of a floating surface of the perpendicular magnetic recording head 10. The first soft magnetic film 21 is present on both sides of the main pole 18, and a non-magnetic film is present between the first soft magnetic film 21 and the main pole 18. The second soft magnetic film 22 is present on the trailing side of the main pole 18, and the non-magnetic film is present between the second soft magnetic film 22 and the main pole 18.

Figure 1:
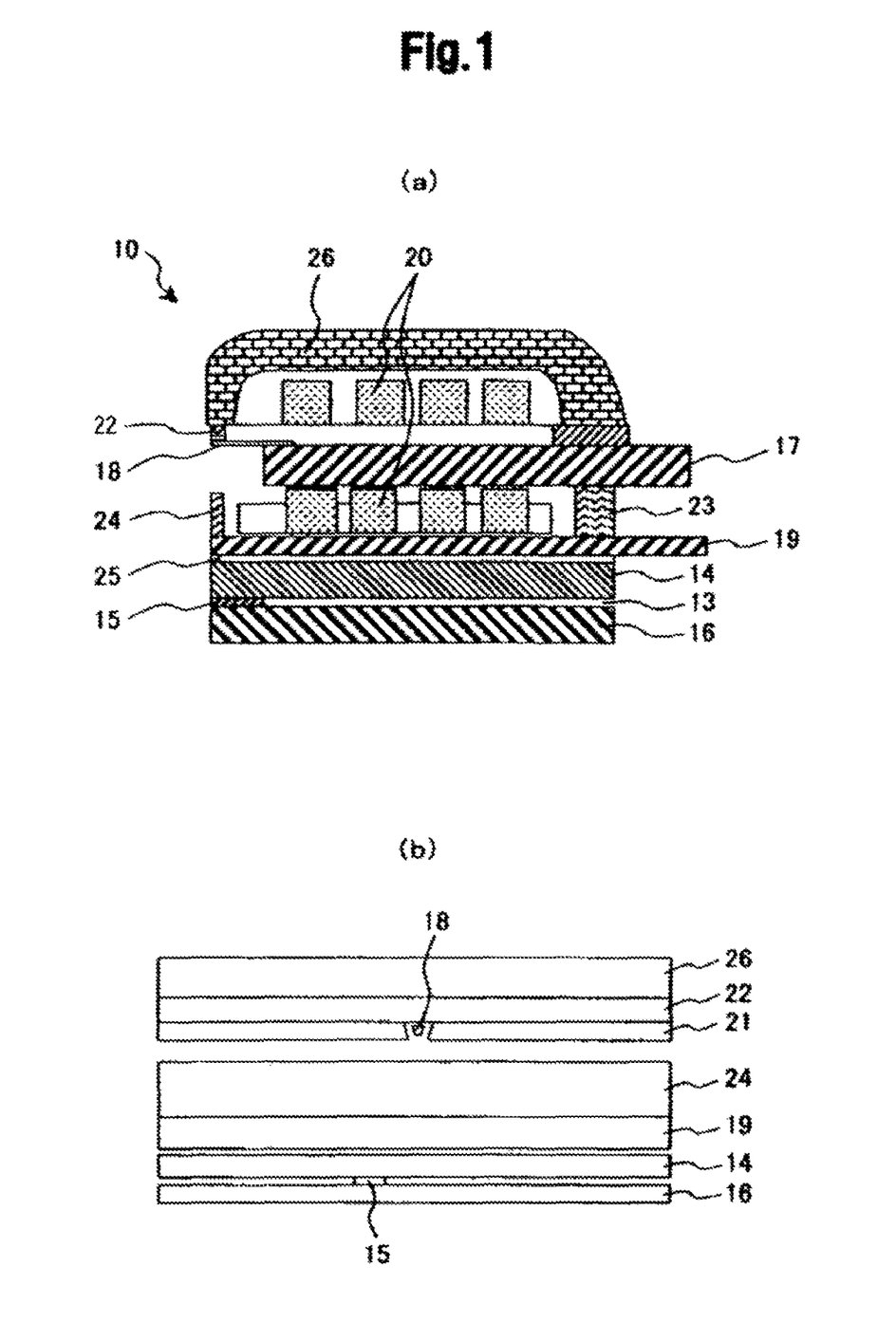
FIGS. 1(a) and 1(b) are a cross sectional view and a front view respectively, of the perpendicular magnetic recording head according to an embodiment of present invention.
Figure 2:
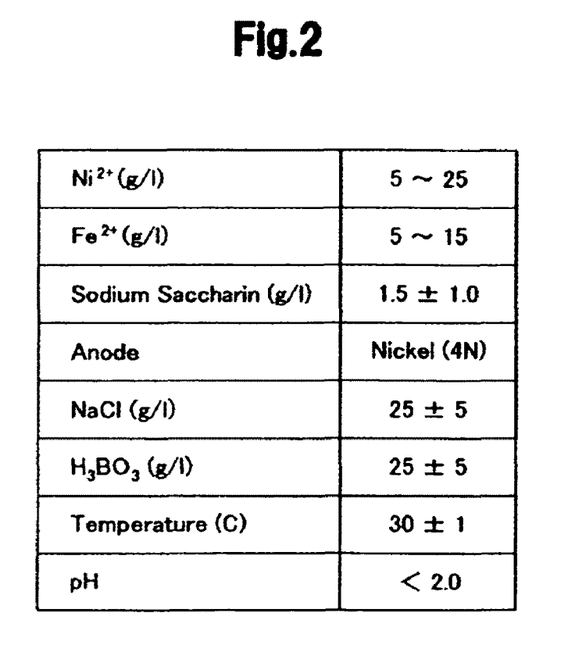
FIG. 2 is a table showing plating conditions and contents included in the plating bath for measurement of the laminated films.
Figure 3:
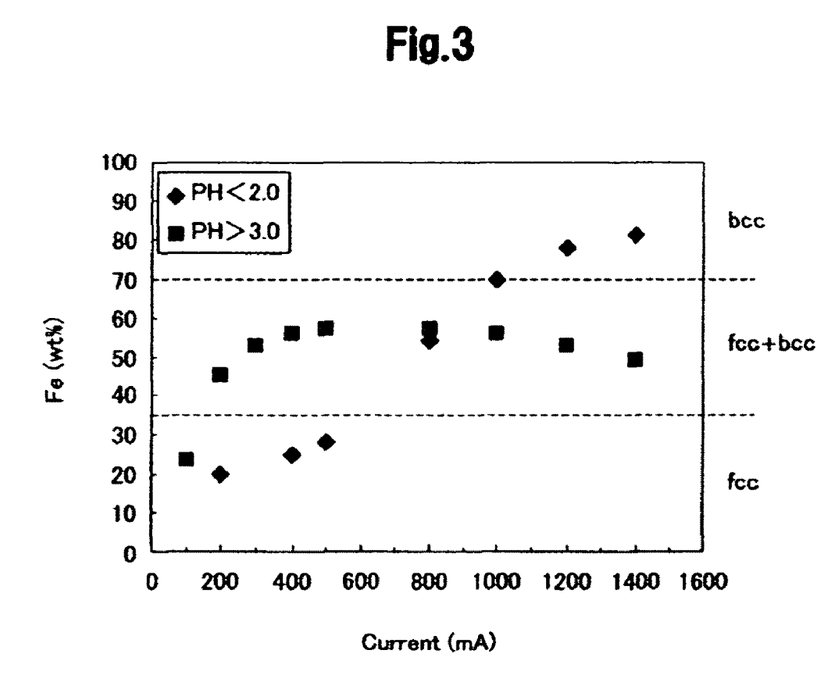
FIG. 3 is a graph showing the relationship between Fe concentration in the plated films containing Fe and Ni and a plating current value.

Embodiments of The present invention are characterized in that the perpendicular magnetic recording head 10 is provided with the first and second soft magnetic films 21 and 22, which are multiple films having different crystal structures each other. This results in that crystal grains contained in the soft magnetic films be small while soft magnetic characteristics of the soft magnetic films are maintained. In addition, the yoke 17 is composed of multiple films having respective crystal structures different from each other. The yoke 17, therefore, has a high saturation flux density and high magnetic permeability. The following describes a method and conditions for forming the multiple films and magnetic characteristics of the multiple films. As the substrate on which the multiple films are to be formed, a ceramic substrate, a glass substrate, or a silicon substrate is used, which has a diameter of 5 inches. A laminated film is formed as a plating conductive underlayer film on any of the abovementioned substrates by sputtering. The laminated film is composed of an Au layer having a thickness of 20 nm and a Cr layer having a thickness of 5 nm. FIG. 2 shows plating conditions and contents included in a plating bath. The temperature of the plating bath is 30±1° C. The contents included in the plating bath are $Fe^{2-}$ of 5 to 15 (g/l), $Ni^{2-}$ of 5 to 25 (g/l), sodium saccharin of 1.5±1.0 (g/l), boric acid ($H_3BO_3$) of 25±5 (g/l) and sodium chloride (NaCl) of 25±5 (g/l). The bath purged with $N_2$ by stirring is used. It is preferable that the ratio of Fe ion concentration in the plating bath to Ni ion concentration in the plating bath be 1:1.5. In this case, a plating solution has a pH of 2.0 or less. In the plating bath with a high pH, the rate of a change in Fe content contained in the plated films is small with respect to a current value as shown in FIG. 3. It is, therefore, impossible to form films which are different in crystal structure each other, in the same plating bath. When the current value is changed in the plating bath with a pH of 2 or less, it is possible to form films having respective crystal structures different from each other in the same plating bath. A constant current power supply is used as a plating power supply. A magnetic field applied to the plated film is 1 kOe. The thickness of each film and contents contained in each film are measured by using a fluorescent x ray analyzer. Magnetic characteristics including Hc (coercive force), Hk (anisotropic magnetic field) and Bs (saturation magnetic flux density) are measured by using a B—H tracer.

Two types of plated magnetic films are alternately laminated using the same plating bath described with reference to FIG. 2 from the start of the plating to the end thereof while a current is alternately increased and decreased. The number of the two types of plated magnetic films laminated is 50. One type of the plated magnetic films have respective thicknesses of 0.5 nm to 20 nm and respective body centered cubic (bcc) lattice crystal structures. Each of the plated magnetic films of this type contains a relatively large amount of Fe. The other type of the plated magnetic films have respective thicknesses of 0.5 nm to 20 nm and respective face centered cubic (fcc) lattice crystal structures. Each of the plated magnetic films of the other type contains a relatively large amount of Ni, which prevents crystal growth of the plated magnetic film having a body centered cubic lattice crystal structure. In the case where the multiple films are the first and second soft magnetic films, each of the plated magnetic films having respective body centered cubic lattice crystal structures contains Ni with a weight percent ranging from 10 to 30, and each of the plated magnetic films having respective face centered cubic lattice crystal structures contains Ni with a weight percent ranging from 55 to 90. The weight percents of Ni and Fe contained in the entire multiple films are 46 and 54, respectively. With these ranges described above, the films having a saturation flux density of 1.5 T or more and magnetic permeability of 2500 or more are obtained.

Figure 4:
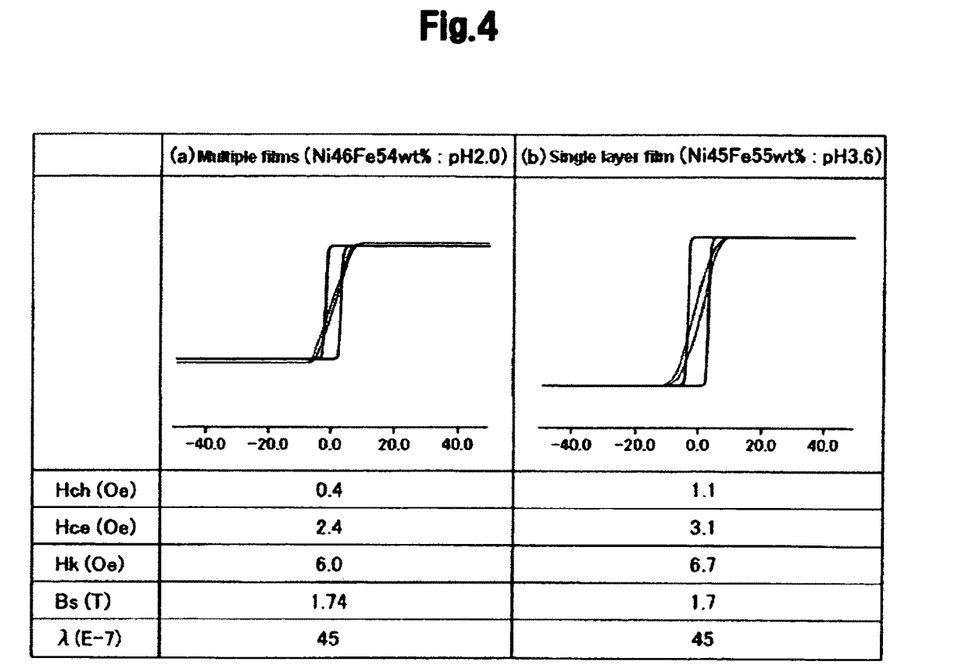
FIG. 4 is a table showing a B—H curve of the plated films containing Ni and Fe and provided in the perpendicular magnetic recording head according to a first embodiment of the present invention.
Figure 5:
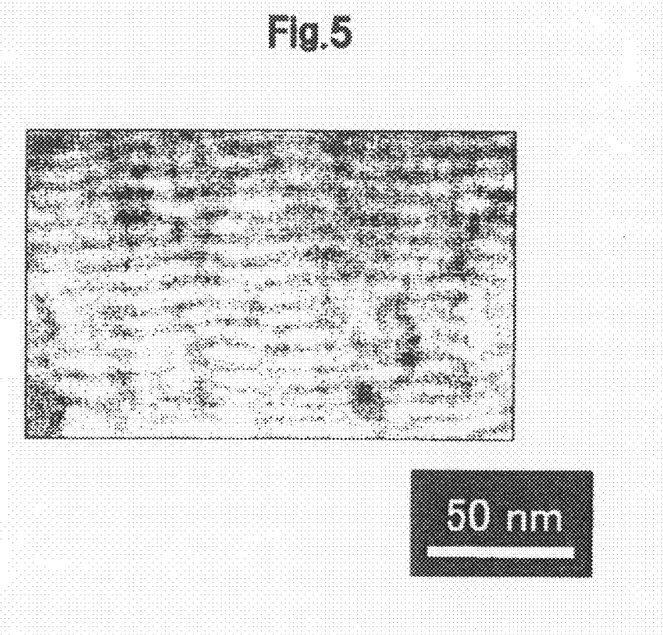
FIG. 5 is a TEM photograph of a cross section of the plated films containing Ni and Fe and provided in the perpendicular magnetic recording head according to the first embodiment.

A B—H curve of the plated multiple films is shown in FIG. 4(a). In terms of the magnetic characteristics of the plated films, a coercive force (Hch) measured in the direction of a hard axis of magnetization is 0.4 Oe, and a coercive force (Hce) measured in the direction of an easy axis of magnetization is 2.4 Oe. In addition, the magnetic characteristics of the plated multiple films include an anisotropic magnetic field (Hk) of 6.0 Oe, magnetostriction λ of 45E-7, a saturation flux density of 1.74 T. The magnetic characteristics of the plated multiple films shown in FIG. 4(b) are substantially the same as magnetic characteristics of a single layer film containing Ni having a weight percent of 45 and Fe having a weight percent of 55. When the current value and the plating time are controlled, it is possible to form plated magnetic films containing Ni having a weight percent ranging from 15 to 60 and Fe having a weight percent ranging from 40 to 85. In this case, the weight percents are values of Ni and Fe contained in the entire plated magnetic films. FIG. 5 shows a TEM photograph of a cross section of the plated magnetic films formed in the abovementioned way. The photograph was taken by mapping of Fe on the cross section in transmission electron microscopy. In FIG. 5, while areas are Fe rich layers, and black areas are Ni rich layers. Based on the results, it is confirmed that the thickness of each plated magnetic film can be controlled according to the target value.

Figure 6:
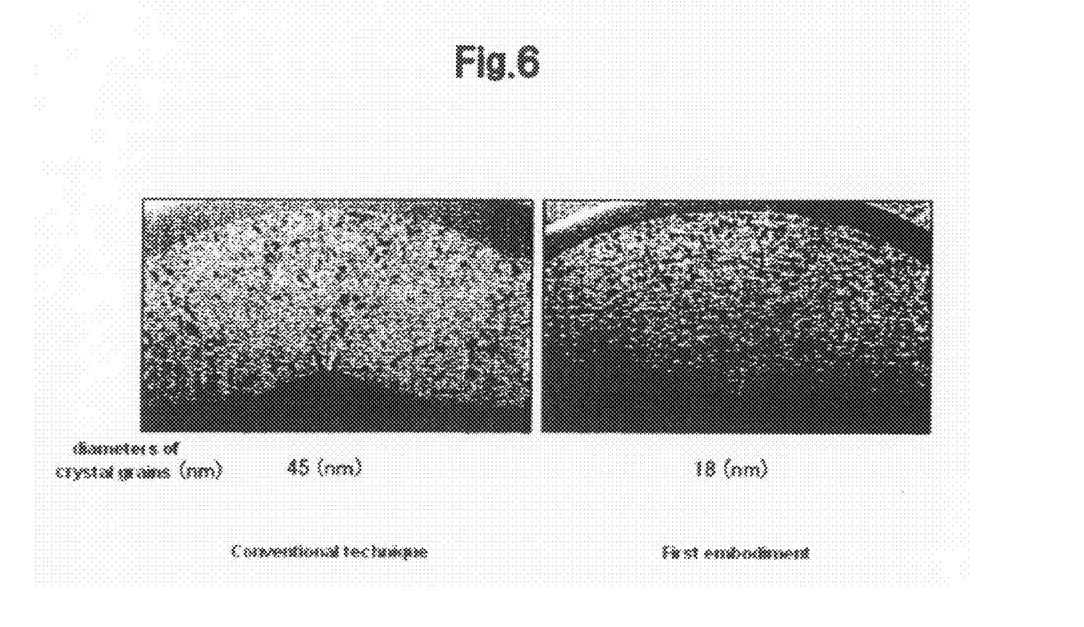
FIG. 6 shows photographs, one of which shows a cross section of the perpendicular magnetic recording head according to the first embodiment.
Figure 7:
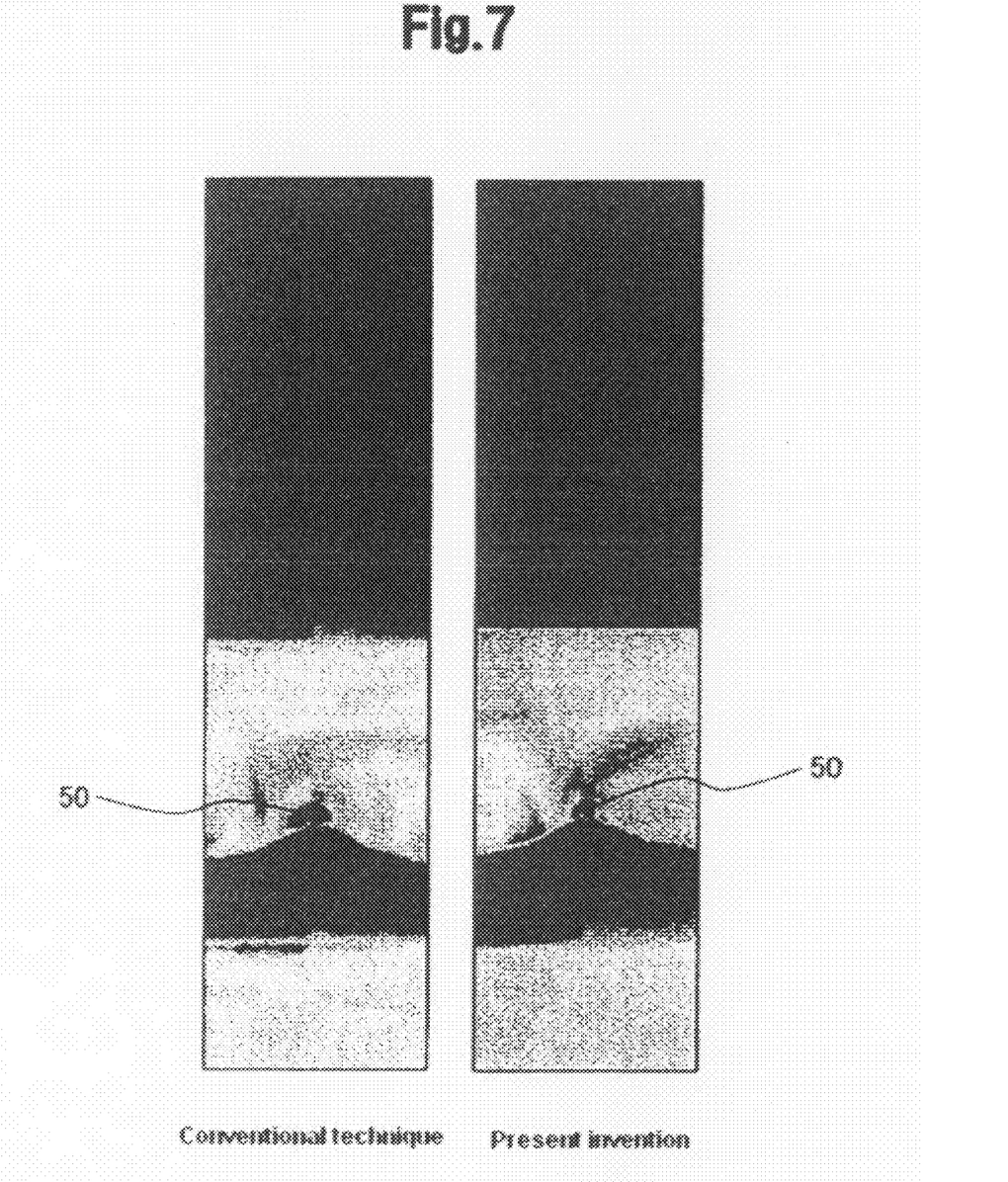
FIG. 7 shows a distribution of a magnetic field intensity in the perpendicular magnetic recording head according to the first embodiment.

FIG. 6 shows a photograph of a cross section of the main pole of the perpendicular magnetic recording head 10 according to the first embodiment, in which the films laminated in the abovementioned way are applied to the first and second soft magnetic films 21 and 22. As apparent from FIG. 6, the average diameters of crystal grains contained in a conventional single layer film is 45 nm, while the average diameters of crystal grains contained in the first and second soft magnetic films according to the first embodiment is 18 nm. In addition, FIG. 7 shows a MFM photograph of the floating surface of the perpendicular magnetic recording head 10 shown in FIG. 6. In FIG. 7, reference numeral 50 denotes parts in which a magnetic field intensity is large. In a conventional head, a magnetic field having a large intensity is distributed in a region larger than a main pole. This means that a magnetic field leaking from the main pole is large. A signal written by means of such a conventional head tends to be erroneously deleted. In the head according to the first embodiment, a magnetic field is distributed in a region substantially corresponding to the main pole. It is apparent that the first and second soft magnetic films causes magnetization of a magnetic domain tends to be directed in an in-plane direction, so that an effect to absorb a magnetic field leaking from the main pole is increased. It is confirmed that high frequency characteristics are excellent and overwrite characteristics are maintained in the perpendicular magnetic recording head 10 according to the first embodiment, compared with the conventional head.

Next, a description will be made of the perpendicular magnetic recording head 10 according to a second embodiment of the present invention. The perpendicular magnetic recording head 10 according to the second embodiment is provided with multiple films applied to the yoke 17. The entire configuration of the perpendicular magnetic recording head 10 according to the second embodiment is the same as that of the perpendicular magnetic recording head 10 according to the first embodiment shown in FIG. 1. Two types of plated magnetic films to be applied to the yoke 17 are alternately laminated in the same plating bath described with reference to FIG. 2 from the start of the plating to the end thereof while a current is alternately increased and decreased. The number of the two types of plated magnetic films laminated is 50. One type of the plated magnetic films have respective thicknesses of 0.5 nm to 20 nm and respective body centered cubic (bcc) lattice crystal structures. Each of the plated magnetic films of this type contains a relatively large amount of Fe. The other one of the two types of the plated magnetic films has a thickness of 0.5 nm to 20 nm and a face centered cubic (fcc) lattice crystal structure. Each of the plated magnetic films of the other type contains a relatively large amount of Ni, which prevents crystal growth of the plated magnetic film having a body centered cubic lattice crystal structure. Each of the plated magnetic films having respective body centered cubic lattice crystal structures contains Ni with a weight percent ranging from 10 to 30, and each of the plated magnetic films having respective face centered cubic lattice crystal structures contains Ni with a weight percent ranging from 55 to 75. The weight percents of Ni and Fe contained in the entire multiple films are 46 and 54, respectively.

Since the multiple films applied to the yoke 17 are obtained by alternately laminating the two types of plated magnetic films having respective body centered cubic lattice crystal structures and plated magnetic films having respective face centered cubic lattice crystal structures, the multiple films having magnetic permeability of 2500 or more are obtained. In addition, each of the multiple films contains Ni and Fe. A weight percent of Ni contained in the entire multiple films is in a range of 15 to 60, and a weight percent of Fe contained in the entire multiple films is in a range of 40 to 85. This results in that the multiple films having a saturation flux density of 1.5 T are obtained.

Figure 8:
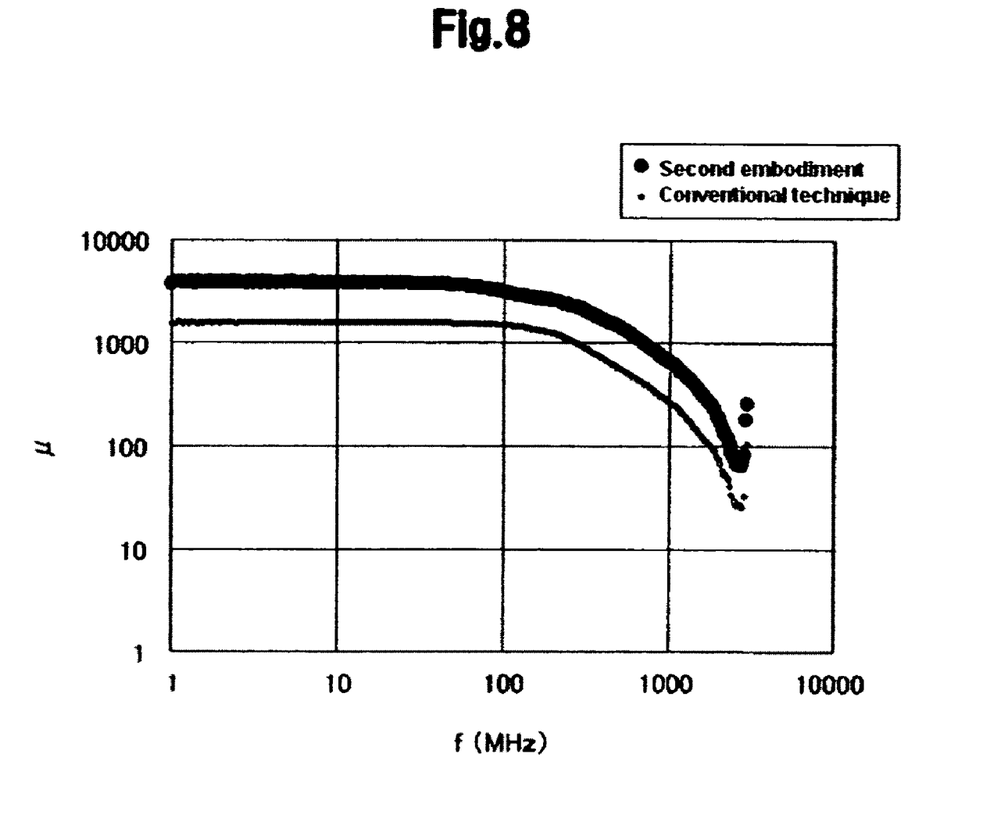
FIG. 8 is a graph showing the relationship between the magnetic permeability of the plated films containing Ni and Fe according to the first and second embodiments and the frequency.

FIG. 8 shows results of measuring dependence of magnetic permeability $\mu$ of the yoke 17 provided in the perpendicular magnetic recording head 10 according to the second embodiment and dependence of magnetic permeability $\mu$ of the single layer film with respect to the frequency. In these cases, weight percents of Ni and Fe contained in both the entire multiple films according to the second embodiment and the entire single layer film are 46 and 54, respectively. The multiple films according to the second embodiment has magnetic permeability $\mu$ larger than that of the single layer film. In addition, although the magnetic permeability $\mu$ of the multiple films is reduced as the frequency is increased, the reduction in the magnetic permeability $\mu$ of the multiple films is smaller than that in the magnetic permeability $\mu$ of the single layer film. It is apparent that the high frequency characteristics are improved based on the results. The multiple films has magnetic permeability of 3000 or more, and the single layer film has magnetic permeability of 1500. Thus, the magnetic permeability of the multiple films is approximately the double of that of the single layer film.

As described above, the perpendicular magnetic recording head according to the second embodiment has a high saturation flux density and high magnetic permeability. This results in the fact that high frequency characteristics are excellent and overwrite characteristics are maintained. Therefore, high density recording can be achieved.

Figure 9:
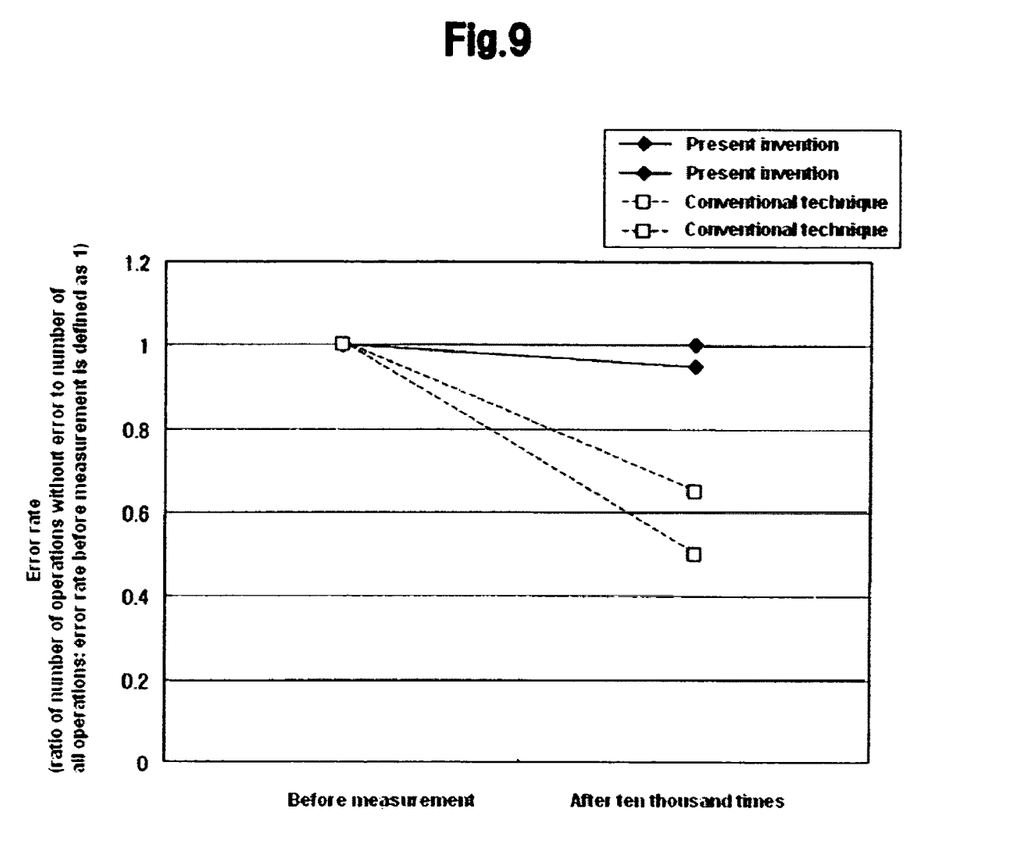
FIG. 9 is a graph showing error rates of the perpendicular magnetic recording head according to a third embodiment.

FIG. 9 shows measurement results of error rates of the perpendicular magnetic recording head 10 according to a third embodiment of the present invention. In the perpendicular magnetic recording head 10 according to the third embodiment, the abovementioned multiple films are applied to each of the first soft magnetic film 21, the second soft magnetic film 22 and the yoke 17. After a signal is written in a certain track ten thousand times, error rates occurring in tracks adjacent to the certain track are measured. Each of the error rates is represented by the ratio of the number of operations without an error to the number of all operations performed in the measurement. As shown in FIG. 9, the error rate, which is obtained before the measurement is performed, is defined as a value of 1. That is, when the number of erroneous operations is small, the error rate indicates a value close to 1. After a signal is written by means of the conventional head ten thousand times, the error rate is reduced. This means that information present in any of the adjacent tracks is deleted by a magnetic field leaking from the main pole of the conventional head during the recording performed ten thousand times and an erroneous operation tends to occur. On the other hand, in the third embodiment, such an adverse effect is not detected. In other words, there is a low possibility that a signal is erroneously deleted after the signal being written. It goes without saying that the perpendicular magnetic recording head according to the third embodiment provides the same effects according to the first and second embodiments.

Next, a description will be made of a method for manufacturing the perpendicular magnetic recording head according to first to third embodiments with reference to FIG. 1. The lower magnetic shield film 16 is formed on the non-magnetic substrate (not shown) by plating. The magnetic gap film 13 and the read element 15 are successively formed on the lower magnetic shield film 16 by sputtering. The read element 15 may be an MR sensor, GMR sensor, or a TMR sensor. Then, the magnetic domain control film (not shown) and the electrode film (not shown) are then formed by sputtering. The upper magnetic shield film 14 is then formed by plating. The insulating separation film 25 composed of alumina or the like is then formed by sputtering. The auxiliary pole 19 is formed on the insulating separation film 25 by plating. Then, the rear magnetic film 23, the base pole 24 and the coil 20 are formed by plating. The yoke 17 is then formed by plating. The main pole 18 (containing Fe, Co, and Ni and having a saturation flux density of more than 2.4 T) is formed on the edge portion of the yoke 17. Then, the non-magnetic film is formed surrounding the main pole 18 by sputtering. After that, the first soft magnetic film 21 is formed on both sides of the main pole 18 by plating, and the second soft magnetic film 22 is formed on the main pole 18. The coil 20 and the magnetic film 26 are then formed by plating. According to the abovementioned method, the perpendicular magnetic recording head 10 is formed. In this method, the first soft magnetic film 21, the second soft magnetic film 22 and the yoke 17 are formed using the plating bath described with reference to FIG. 2 from the start of the plating to the end thereof while a current is alternately increased and decreased, as described in the first and second embodiments. In the method, the first and second soft magnetic films 21 and 22 are separately formed. However, the first and second soft magnetic films 21 and 22 may be formed simultaneously. In addition, although the main pole 18 is formed by plating in the method, it may be formed by sputtering.

Figure 10:
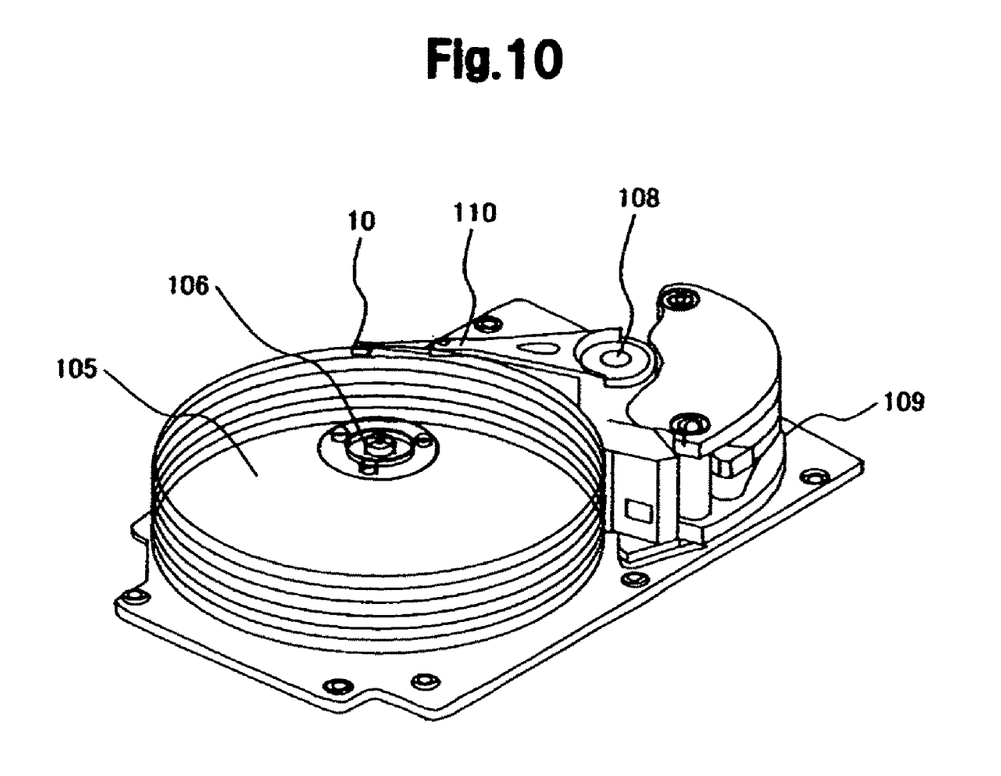
FIG. 10 is a diagram showing the magnetic disk drive including the perpendicular magnetic recording head according to an embodiment of the present invention.

Next, a description will be made of a magnetic disk drive provided with the perpendicular magnetic recording head 10 according to each of the above embodiments with reference to FIG. 10. The magnetic disk drive 100 includes a magnetic disk 105, a motor 106, the perpendicular magnetic recording head 10, a suspension 110, an actuator 108, a voice coil motor 109, a magnetic disk rotation control system, a head positioning control system, and a write/read signal processing system. The magnetic disk 105 stores information therein. The motor 106 is adapted to rotate the magnetic disk 105. The perpendicular magnetic recording head 10 writes and reads information into and from the magnetic disk 105. The suspension 110 supports the perpendicular magnetic recording head 10. The actuator 108 is adapted to move the perpendicular magnetic recording head 10 to a target track of the magnetic disk 105. The voice coil motor 19 drives the actuator 108. The magnetic disk rotation control system, the head positioning control system, and the write/read signal processing system are not shown in FIG. 10. The perpendicular magnetic recording head 10 is floated stably above the magnetic disk 105 by means of the suspension 110 with a gap of a submicron order between the perpendicular magnetic recording head 10 and the magnetic disk 105 to write or read information. In the magnetic disk drive, a possibility to erroneously delete information after the information being written is reduced, and characteristics of a written signal having a high frequency of 2000 MHz or less are not degraded.

What is claimed is:

1. A perpendicular magnetic recording head comprising:
    an auxiliary pole;
    a main pole;
    a yoke provided in contact with the main pole;
    a coil wound around a magnetic circuit composed of the auxiliary pole, the main pole and the yoke;
    a first soft magnetic film provided on both sides of the main pole with a non-magnetic film provided between the first soft magnetic film and the main pole; and
    a second soft magnetic film provided on a trailing side of the main pole with the non-magnetic film provided between the second soft magnetic film and the main pole, wherein
    the first and second soft magnetic films are two types of plated magnetic films, one type of the plated magnetic films having respective thicknesses of 0.5 nm to 20 nm and respective body centered cubic lattice crystal structures, the other type of the plated magnetic films having respective thicknesses of 0.5 nm to 20 nm and respective face centered cubic lattice crystal structures, and the two types of plated magnetic films being alternately laminated with four or more layers.

2. The perpendicular magnetic recording head according to claim 1, wherein,
    each of the plated magnetic films constituting the first and second soft magnetic films contains Ni and Fe, and
    the weight percent of Ni contained in the entire plated magnetic films is in a range of 1.5 to 60, and the weight percent of Fe contained in the entire plated magnetic films is in a range of 40 to 85.

3. The perpendicular magnetic recording head according to claim 2, wherein
    the weight percent of Ni contained in each of the plated magnetic films having respective body centered cubic lattice crystal structures is in a range of 10 to 30, and the weight percent of Ni contained in each of the plated magnetic films having respective face centered cubic lattice crystal structures is in a range of 55 to 90.

4. The perpendicular magnetic recording head according to claim 1, wherein
    the yoke includes two types of plated magnetic films, one type of the plated magnetic films having respective thicknesses of 0.5 nm to 20 nm and respective body centered cubic lattice crystal structures, the other type of the plated magnetic films having respective thicknesses of 0.5 nm to 20 nm and respective face centered cubic lattice crystal structures, and the two types of plated magnetic films being alternately laminated with four or more layers.

5. The perpendicular magnetic recording head according to claim 4, wherein
    each of the plated magnetic films constituting the yoke contains Ni and Fe, and the weight percent of Ni contained in the entire plated magnetic films is in a range of 15 to 60, and the weight percent of Fe contained in the entire plated magnetic films is in a range of 40 to 85.

6. The perpendicular magnetic recording head according to claim 5, wherein
    the weight percent of Ni contained in each of the plated magnetic films having respective body centered cubic lattice crystal structures is in a range of 10 to 30, and the weight percent of Ni contained in each of the plated magnetic films having respective face centered cubic lattice crystal structures is in a range of 55 to 90.

7. The perpendicular magnetic recording head according to claim further comprising a read head including:
    a lower magnetic shield film;
    an upper magnetic shield film; and
    a read element provided between the upper and lower magnetic shield films.

8. A perpendicular magnetic recording head comprising:
an auxiliary pole;
a main pole;
a yoke provided in contact with the main pole; and
a coil wound around a magnetic circuit composed of the auxiliary pole, the ma pole and the yoke, wherein
the yoke includes two types of plated magnetic films, one type of the plated magnetic films having respective thicknesses of 0.5 nm to 20 nm and respective body centered cubic lattice crystal structures, the other type of the plated magnetic films having respective thicknesses of 0.5 nm to 20 nm and respective face centered cubic lattice crystal structures, and the two types of plated magnetic films being alternately laminated with four or more layers.

9. The perpendicular magnetic recording head according to claim 8, wherein
each of the plated magnetic films constituting the yoke contains Ni and Fe, and
the weight percent of Ni contained in the entire plated magnetic films is in a range of 15 to 60, and the weight percent of Fe contained in the entire plated magnetic films is in a range of 40 to 85.

10. The perpendicular magnetic recording head according to claim 9, wherein,
the weight percent of Ni contained in each of the plated magnetic films having respective body centered cubic lattice crystal structures is in a range of 10 to 30, and the weight percent of Ni contained in each of the plated magnetic films having respective face centered cubic lattice crystal structures is in a range of 55 to 90.

11. The perpendicular magnetic recording head according to claim 8, further comprising a read head including:
a lower magnetic shield film;
an upper magnetic shield film; and
a read element provided between the upper and lower magnetic shield films.

12. A method for manufacturing a perpendicular magnetic recording head, comprising the steps:
forming an auxiliary pole;
forming a coil above the auxiliary pole;
forming a yoke, which is magnetically connected with the auxiliary pole, above the coil on the opposite side of a floating surface of the perpendicular magnetic recording head;
forming a main pole, which is magnetically connected with the yoke, on the side of the floating surface;
forming a first soft magnetic film on both sides of the main pole with a non-magnetic film provided between the first soft magnetic film and the main pole; and
forming a second soft magnetic film on a trailing side of the main pole with the non-magnetic film provided between the second soft magnetic film and the main pole, wherein
the steps of forming the first and second soft magnetic films includes the step of forming two types of plated magnetic films, one type of the plated magnetic films having respective thicknesses of 0.5 nm to 20 nm and respective body centered cubic lattice crystal structures, the other type of the plated magnetic films having respective thicknesses of 0.5 nm to 20 nm and respective face centered cubic lattice crystal structures, and the two types of plated magnetic films being alternately laminated with four or more layers,
wherein the perpendicular magnetic recording head comprises;
the auxiliary pole;
the main pole;
the yoke in contact with the main pole;
the coil wound around a magnetic circuit composed of the auxiliary pole, the main pole and the yoke;
the first soft magnetic film on both sides of the main pole with the non-magnetic film between the first soft magnetic film and the main pole; and
the second soft magnetic film on the trailing side of the main pole with the non-magnetic film between the second soft magnetic film and the main pole, wherein the first and second soft magnetic films are the two types of plated magnetic films, were the one type of the plated magnetic films has respective thicknesses of 0.5 nm to 20 nm and respective body centered cubic lattice crystal structures, and where the other type of the plated magnetic films has respective thicknesses of 0.5 nm to 20 nm and respective face centered cubic lattice crystal structures, and the two types of plated magnetic films are alternately laminated with four or more layers.

13. The method according to claim 12, wherein
each of the plated magnetic films constituting the first and second soft magnetic films contains Ni and Fe, and
the weight percent of Ni contained in the entire plated magnetic films is in a range of 15 to 60, and a weight percent of Fe contained in the entire plated magnetic films is in a range of 40 to 85.

14. The method according to claim 13, wherein
the weight percent of Ni contained in each of the plated magnetic films having respective body centered cubic lattice crystal structures is in a range of 10 to 30, and the weight percent of Ni contained in each of the plated magnetic films having respective face centered cubic lattice crystal structures is in a range of 55 to 90.

15. The method according to claim 12, wherein
the step of forming the yoke includes the step of forming the two types of plated magnetic films, one type of the plated magnetic films having respective thicknesses of 0.5 nm to 20 nm and respective body centered cubic lattice crystal structures, the other type of the plated magnetic films having respective thicknesses of 0.5 nm to 20 nm and respective face centered cubic, lattice crystal structures, and the two types of plated magnetic films being alternately laminated with four or more layers.

16. The method according to claim 15, wherein
each of the plated magnetic films constituting the yoke contains Ni and Fe, and
the weight percent of Ni contained in the entire plated magnetic films is in a range of 15 to 60, and the weight percent of Fe contained in the entire plated magnetic films is in a range of 40 to 85.

17. The method according, to claim 16, wherein
the weight percent of Ni contained in each of the plated magnetic films having respective body centered cubic lattice crystal structures is in a range of 10 to 30, and the weight percent of Ni contained in each of the plated magnetic films having respective face centered cubic lattice crystal structures is in a range of 55 to 90.

18. The method according to claim 12, further comprising, the step of forming a read head before the step of forming the auxiliary pole.

* * * * *

UNITED STATES PATENT AND TRADEMARK OFFICE
CERTIFICATE OF CORRECTION

| | | |
|---|---|---|
| PATENT NO. | : 8,064,161 B2 | Page 1 of 1 |
| APPLICATION NO. | : 12/231246 | |
| DATED | : November 22, 2011 | |
| INVENTOR(S) | : Kudo et al. | |

It is certified that error appears in the above-identified patent and that said Letters Patent is hereby corrected as shown below:

Col. 10, line 25 replace "1.5" with --15--;
Col. 11, line 6 replace "ma" with --main--;
Col. 12, line 2 replace "prises;" with --prises:--.

Signed and Sealed this
Tenth Day of January, 2012

David J. Kappos
*Director of the United States Patent and Trademark Office*